(12) United States Patent
Zhang et al.

(10) Patent No.: US 12,300,218 B2
(45) Date of Patent: May 13, 2025

(54) METHOD AND APPARATUS FOR TRAINING ACOUSTIC NETWORK MODEL, AND ELECTRONIC DEVICE

(71) Applicant: Beijing Bytedance Network Technology Co., Ltd., Beijing (CN)

(72) Inventors: Jun Zhang, Beijing (CN); Lu Huang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 17/758,453

(22) PCT Filed: Feb. 19, 2021

(86) PCT No.: PCT/CN2021/076931
§ 371 (c)(1),
(2) Date: Jul. 6, 2022

(87) PCT Pub. No.: WO2021/212985
PCT Pub. Date: Oct. 28, 2021

(65) Prior Publication Data
US 2023/0036600 A1    Feb. 2, 2023

(30) Foreign Application Priority Data
Apr. 21, 2020   (CN) .......................... 202010317763.4

(51) Int. Cl.
*G10L 15/00*    (2013.01)
*G10L 15/02*    (2006.01)
(Continued)

(52) U.S. Cl.
CPC ............ *G10L 15/063* (2013.01); *G10L 15/02* (2013.01); *G10L 15/04* (2013.01); *G10L 15/16* (2013.01);
(Continued)

(58) Field of Classification Search
None
See application file for complete search history.

(56) References Cited

U.S. PATENT DOCUMENTS 10,229,672 B1 *   3/2019   Rao .......................... G10L 15/16
10,803,855 B1 *  10/2020   Rao .......................... G10L 15/16
(Continued)

FOREIGN PATENT DOCUMENTS

CN           1661675 A    8/2005
CN        101149928 A    3/2008
(Continued)

OTHER PUBLICATIONS

First Office Action issues Aug. 11, 2021 in connection with Chinese Patent Application No. 202010317763.4.
(Continued)

*Primary Examiner* — Satwant K Singh
(74) *Attorney, Agent, or Firm* — Astute IP Law Group (57) ABSTRACT

Disclosed are a method and apparatus for training an acoustic network model, and an electronic device, a readable storage medium, a computer program product and a program, wherein same belong to the technical field of data processing. The method comprises: acquiring a training sample for training of an acoustic network model, wherein the training sample includes one or more speech files (S101); performing peak detection on speech included in the speech file by using a BLSTM network, so as to divide letters included in the speech file on the basis of a detected peak, thereby forming segmented speech (S102); performing semantic prediction on the segmented speech on the basis of a preset CTC segmentation network to obtain a text prediction result (S103); and after the prediction result meets a preset performance requirement, stopping the training of the acoustic network model so as to perform text prediction on input speech by using the acoustic network model (S104).

(Continued)

The method can improve the training efficiency of an acoustic network model.

20 Claims, 3 Drawing Sheets

(51) Int. Cl.
*G10L 15/04* (2013.01)
*G10L 15/06* (2013.01)
*G10L 15/16* (2006.01)
*G10L 15/18* (2013.01)
(52) U.S. Cl.
CPC ...... *G10L 15/1815* (2013.01); *G10L 15/1822* (2013.01)

(56) References Cited

U.S. PATENT DOCUMENTS

| | | | |
|---|---|---|---|
| 2005/0192805 A1 | 9/2005 | Kudoh | |
| 2008/0069364 A1 | 3/2008 | Itou et al. | |
| 2016/0254007 A1 | 9/2016 | Guo et al. | |
| 2018/0330718 A1* | 11/2018 | Hori | G06N 3/08 |
| 2019/0189111 A1 | 6/2019 | Watanabe et al. | |
| 2019/0189115 A1* | 6/2019 | Hori | G10L 15/22 |
| 2019/0318757 A1 | 10/2019 | Chen et al. | |
| 2020/0074983 A1* | 3/2020 | Yu | G10L 15/16 |

FOREIGN PATENT DOCUMENTS

| | | |
|---|---|---|
| CN | 107533848 A | 1/2018 |
| CN | 108257592 A | 7/2018 |
| CN | 108417202 A | 8/2018 |
| CN | 108806723 A | 11/2018 |
| CN | 109584896 A | 4/2019 |
| CN | 110136749 A | 8/2019 |
| CN | 110634469 A | 12/2019 |
| CN | 110706710 A | 1/2020 |
| CN | 111540344 A | 8/2020 |
| JP | 2003233389 A | 8/2003 |
| WO | 2019119554 A1 | 10/2019 |
| WO | 2019199554 A1 | 10/2019 |

OTHER PUBLICATIONS

International Search Report mailed on May 24, 2021, from International Application No. PCT/CN2021/076931, International Filing Date Feb. 19, 2021.
Yao et al., "End-to-end Chinese speech recognition system using bidirectional long short-term memory networks and weighted finite-state transducers", Journal of Computer Applications, vol. 38, No. 9, Sep. 10, 2018, 5 pages, with English Abstract.
Wang S., "Overview of End-to-end Speech Recognition," ISPECE, IOP Conf. Series: Journal of Physics: Conference Series 1187, Dec. 31, 2019, 5 pages.

* cited by examiner

METHOD AND APPARATUS FOR TRAINING ACOUSTIC NETWORK MODEL, AND ELECTRONIC DEVICE

CROSS REFERENCE TO RELATED APPLICATION

The present application is a national stage of International Application No. PCT/CN2021/076931, filed on Feb. 19, 2021, which claims the priority to the Chinese Patent Application No. 202010317763.4, titled "METHOD AND APPARATUS FOR TRAINING ACOUSTIC NETWORK MODEL, AND ELECTRONIC DEVICE", filed on Apr. 21, 2020, both of which are incorporated herein by reference in their entireties.

FIELD

The present disclosure relates to the technical field of data processing, and in particular, to a method and an apparatus for training an acoustic network model, and an electronic device.

BACKGROUND

Speech processing, also known as speech signal processing or human voice processing, aims to generate a desired signal and further perform speech recognition on the desired signal. Speech processing may be applied to a mobile phone interface and even ordinary life, such that people can communicate with a computer.

In the process of speech processing, a human voice signal may be received via a microphone or other apparatuses. Digitization processing is then performed on the human voice signal via an analog digital conversion (ADC) apparatus. Finally, a digitized human voice signal is output via a digital analog conversion apparatus. Therefore, the processing is performed on the digital signal. The speech signal is a discrete-time signal. The signal processing flow includes the following steps. A signal is received and sampled, by receiving an analog speech signal using a microphone or various sound collecting apparatuses, converting the analog signal into a digital signal using an ADC apparatus (such as an analog digital conversion card), and sampling the digital signal according to the Nyquist theory. The signal is distorted in a case of not conforming to the theory. Quantizing and encoding are performed. Since information in the computer is stored in 0 and 1, the received data should be represented and stored with a suitable set of 0 and 1. This process is called quantization. The larger number of 0 and 1 indicates that the more memory is required. Then, the value is presented as a waveform by using an encoder. The speech signal is standardized so that its values all fall in the same range. Since the speech signal is a very long signal, a part to be processed of the speech signal is extracted by a frame. Since the noise is mostly concentrated in the high-frequency part, the noise may be simply removed by using a high-frequency filter.

In the process of predicting speech files by using a bidirectional long short-term memory (BLSTM) network, the prediction results may be unstable. Therefore, it is required to perform network training to achieve the stable prediction results based on the BLSTM network.

SUMMARY

In view of this, a method and an apparatus for training an acoustic network model, and an electronic device are provided according to embodiments of the present disclosure, in order to at least partially solve the problems in the technology.

In a first aspect, a method for training an acoustic network model is provided according to an embodiment of the present disclosure, which includes:
  acquiring a training sample for training the acoustic network model, where the training sample includes at least one speech file;
  performing peak detection on speech in the speech file by using a BLSTM network, and dividing letters in the speech file based on a detected peak to form speech segments;
  performing semantic prediction on the speech segments based on a preset CTC segmentation network, to obtain text prediction results; and
  stopping training the acoustic network model in response to the prediction results meeting a preset performance demand, to perform text prediction on input speech by using the acoustic network model.

According to an embodiment of the present disclosure, the acquiring the training sample for training the acoustic network model, where the training sample includes the at least one speech file, includes:
  acquiring multiple speech files based on preset categories;
  performing semantic annotation on the multiple speech files; and
  forming the training sample based on annotated semantic files.

According to an embodiment of the present disclosure, the performing the peak detection on the speech in the speech file by using the BLSTM network includes:
  performing feature extraction on an input speech file by using the BLSTM network;
  determining a time point of a peak feature in the speech file based on an extracted speech feature; and
  determining the time point as a time point of the peak.

According to an embodiment of the present disclosure, the performing the semantic prediction on the speech segments based on the preset CTC segmentation network includes:
  performing semantic parsing on the speech segments by using the CTC segmentation network to obtain parsing results; and
  predicting semantic texts corresponding to the speech segments based on the parsing results.

According to an embodiment of the present disclosure, the stopping training the acoustic network model in response to the prediction results meeting the preset performance requirement includes:
  acquiring an output result of the acoustic network model;
  comparing the output result with the semantic annotation to form a comparison result; and
  stopping training the acoustic network model in response to the comparison result meeting a preset demand.

According to an embodiment of the present disclosure, before the performing the peak detection on the speech in the speech file by using the BLSTM network, the method further includes:
  forming a loss function for training the BLSTM network based on a set first training parameter and a set second training parameter related to an LSTM network, after randomly initializing an LSTM network model;
  gradually increasing a value of the first training parameter with a gradual decrease of a value of the second training parameter, in a process of training the BLSTM network; and stopping training the BLSTM network in response to a performance index output by the BLSTM network meeting a preset demand, to perform real-time peak detection on an input speech file by using the BLSTM network.

According to an embodiment of the present disclosure, the forming the loss function for training the BLSTM network includes:

acquiring a first output result of a CTC network connected to the LSTM network model; and determining a product of the first output result and the first training parameter as a first component of the loss function.

According to an embodiment of the present disclosure, the forming the loss function for training the BLSTM network includes:

acquiring a KL divergence output by the LSTM network model in a training process of the LSTM network model; and determining a product of the KL divergence and the second training parameter as a second component of the loss function.

In a second aspect, an apparatus for training an acoustic network model is provided according to an embodiment of the present disclosure, which includes an acquisition module, a detection module, a prediction module, and an execution module.

The acquisition module is configured to acquire a training sample for training the acoustic network model, where the training sample includes at least one speech file.

The detection module is configured to perform peak detection on speech in the speech file by using a BLSTM network, and divide letters in the speech file based on a detected peak to form speech segments.

The prediction module is configured to perform semantic prediction on the speech segments based on a preset CTC segmentation network, to obtain text prediction results.

The execution module is configured to stop training the acoustic network model in response to the prediction results meeting a preset performance demand, to perform text prediction on input speech by using the acoustic network model.

In a third aspect, an electronic device is further provided according to an embodiment of the present disclosure. The electronic device includes at least one processor, and a memory in communication with the at least one processor.

The memory stores instructions executable by the at least one processor, and the instructions, when executed by the at least one processor, cause the at least one processor to perform the method for training the acoustic network model according to the first aspect or any embodiment of the first aspect.

In a fourth aspect, a non-transitory computer readable storage medium storing computer instructions is further provided according to an embodiment of the present disclosure. The computer instructions are configured to cause a computer to perform the method for training the acoustic network model according to the first aspect or any embodiment of the first aspect.

In a fifth aspect, a computer program product is further provided according to an embodiment of the present disclosure. The computer program product includes a computer program stored on a non-transitory computer readable storage medium. The computer program includes program instructions that, when executed by a computer, cause the computer to perform the method for training the acoustic network model according to the first aspect or any embodiment of the first aspect.

In a sixth aspect, a computer program product including a computer program carried on a computer readable storage medium is further provided according to an embodiment of the present disclosure. The computer program, when executed by a processor, causes the processor to perform the method for training the acoustic network model according to the first aspect or any embodiment of the first aspect.

In a seventh aspect, a computer program is further provided according to an embodiment of the present disclosure. The computer program, when executed on an electronic device, causes the electronic device to perform the method for training the acoustic network model according to the first aspect or any embodiment of the first aspect.

BRIEF DESCRIPTION OF THE DRAWINGS

The drawings to be used in the descriptions of embodiments are described briefly as follows, so that technical solutions according to the embodiments of the present disclosure may become clearer. Apparently, the drawings in the following descriptions only illustrate some embodiments of the present disclosure. For those skilled in the art, other drawings may be obtained based on these drawings without any creative work.

DETAILED DESCRIPTION OF EMBODIMENTS

The embodiments of the present disclosure are described in detail hereinafter with reference to the drawings.

Implementation of the present disclosure is described hereinafter through specific instances. Those skilled in the art can easily understand other advantages and effects of the present disclosure from the content disclosed in this specification. Obviously, the described embodiments are only some of the embodiments of the present disclosure, rather than all of the embodiments. The present disclosure can also be implemented or applied through other different embodiments. Besides, details mentioned in the specification can be modified or alternated based on different viewpoints and applications, without departing from the spirit of the present disclosure. It is to be noted that, the embodiments of the present disclosure and features in the embodiments may be combined with each other without causing conflicts. Based on the embodiments of the present disclosure, all other embodiments obtained by those skilled in the art without any creative effort shall fall within the scope of protection of the present disclosure.

It is to be noted that, various aspects of the embodiments within the scope of the appended claims are described below. It is obvious that the aspects described herein can be embodied in a variety of forms, and any specific structure and/or function described herein are only illustrative. Based on the present disclosure, those skilled in the art should understand that an aspect described herein can be implemented independently from any other aspects, and two or more of these aspects can be combined in various ways. For example, any number of aspects set forth herein can be used to implement devices and/or to practice methods. In addition, other structures and/or functionalities other than one or more of the aspects set forth herein may be used to implement the device and/or to practice the method.

It is to be noted that, the drawings illustrated with the following embodiments are only intended to illustrate the basic concepts of the present disclosure by way of example. The drawings only show the components related to the present disclosure, which are not necessarily drawn as the actual quantity, shape and scale adopted in practice. The actual form, quantity and proportion of each component can be adjusted as desired in an actual implementation, in which the components may be arranged even more complicated.

Furthermore, details in the following description are for a purpose of a thorough understanding of the embodiments. However, it is to be understood by those skilled in the art that an aspect of the present disclosure may be practiced without these details.

A method for training an acoustic network model is provided according to an embodiment of the present disclosure. The method for training the acoustic network model according to this embodiment may be performed by a computing device, which may be implemented as software, or as a combination of software and hardware. The computing means may be integrated in a server, client device or the like.

Figure 1:
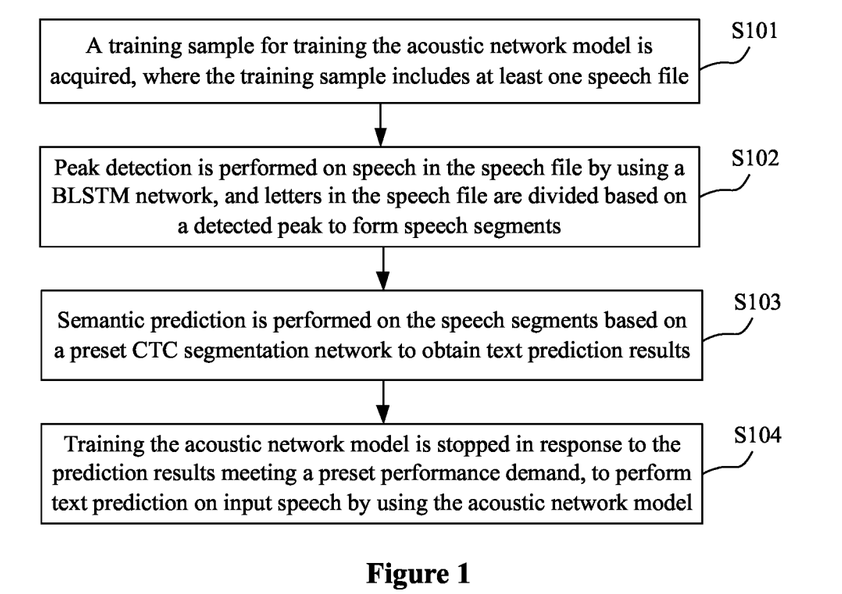
FIG. 1 is a flowchart of a method for training an acoustic network model according to an embodiment of the present disclosure.

Referring to FIG. 1, a method for training an acoustic network model according to an embodiment of the present disclosure may include the following steps S101 to S104.

In step S101, a training sample for training the acoustic network model is acquired, where the training sample includes at least one speech file.

Before an acoustic network model is trained, multiple speech files need to be collected, and the multiple speech files are combined into a speech set to form a training sample. The training sample is used to train the acoustic network model.

In order to ensure that the collected training sample meets diverse requirements, multiple different speech categories may be preset. Based on the preset categories, the preset number of speech files are filled in each category, to acquire multiple speech files required for the training sample.

After the speech files are acquired, semantic annotation may be performed on the multiple speech files. Based on the semantic annotation, specific text content to be expressed by the speech may be determined. Finally, the training sample is formed by merging the speech files and the annotated semantic files together.

In step S102, peak detection is performed on speech in the speech file by using a BLSTM network, and letters in the speech file are divided based on a detected peak to form speech segments.

A bidirectional long short-term memory (BLSTM) network model is used to parse speech, which has the advantages of fast speed and short training time. Therefore, a speech peak in the speech may be detected by using a trained BLSTM network. The speech peak represents a dividing point between different sound components in the speech. By detecting the speech peak and dividing the speech file, multiple speech segments including different letters may be formed.

As a real-time method, for an application scenario with high real-time and accuracy requirements (e.g. real-time parsing of speech subtitles), the BLSTM network has the disadvantage of inaccurate prediction of the occurrence time of a single text, which affects the timeliness of speech-to-text prediction. Therefore, a long short-term memory (LSTM) network model is set. Since the LSTM model has the advantage of high timeliness of predicting text, the BLSTM network model may be trained by using the LSTM network model, so that the BLSTM network model has the same prediction performance as the LSTM model.

In step S103, semantic prediction is performed on the speech segments based on a preset CTC segmentation network to obtain text prediction results.

A connectionist temporal classification (CTC) segmentation network is connected to an output of the BLSTM network. After the BLSTM network is set, a loss function of the BLSTM may be constructed by using an output of the CTC network connected to the output of the BLSTM network. Then, semantic prediction is performed on the speech segments by using the loss function, to determine a specific meaning represented by each semantic segment, and obtain text prediction results corresponding to the speech segments.

In step S104, training the acoustic network model is stopped in response to the prediction results meeting a preset performance demand, to perform text prediction on input speech by using the acoustic network model.

Performance parameters of the acoustic network model may be preset. After the acoustic network model meet the preset performance parameters, training the acoustic network model is stopped. Therefore, real-time text prediction is performed on an input speech file by using the trained acoustic network model.

With the solution in this embodiment, the peak detection is performed on the speech by using the BLSTM, and the text detection is performed on the speech file based on the detected speech segment, thereby improving the accuracy of speech prediction.

Figure 2:
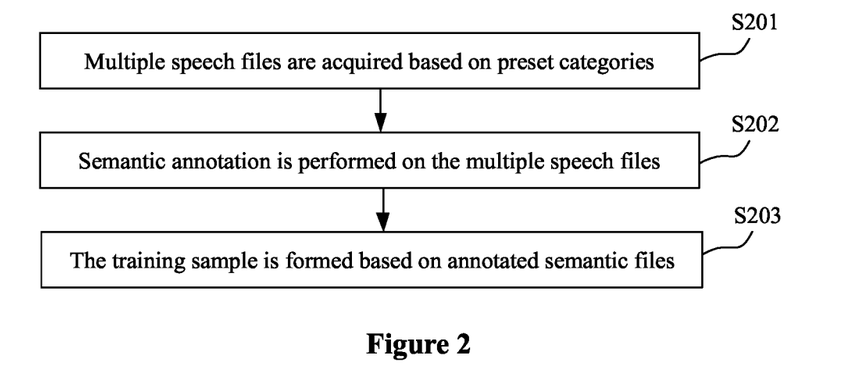
FIG. 2 is a flowchart of a method for training an acoustic network model according to another embodiment of the present disclosure.

Referring to FIG. 2, according to an embodiment of the present disclosure, the step of acquiring the training sample for training the acoustic network model, where the training sample includes the at least one speech file, includes the following steps S201 to S203.

In step S201, multiple speech files are acquired based on preset categories.

Based on preset multiple speech categories, different types of speech files may be filled in the multiple categories, to meet the diverse requirements of speech files. Thus, multiple speech files are formed.

In step S202, semantic annotation is performed on the multiple speech files.

After the multiple speech files are acquired, semantic annotation nay be performed on the speech files in a manual annotation manner, to form text contents corresponding to the speech files.

In step S203, the training sample is formed based on annotated semantic files.

According to this embodiment, diverse speech training samples may be formed.

Figure 3:
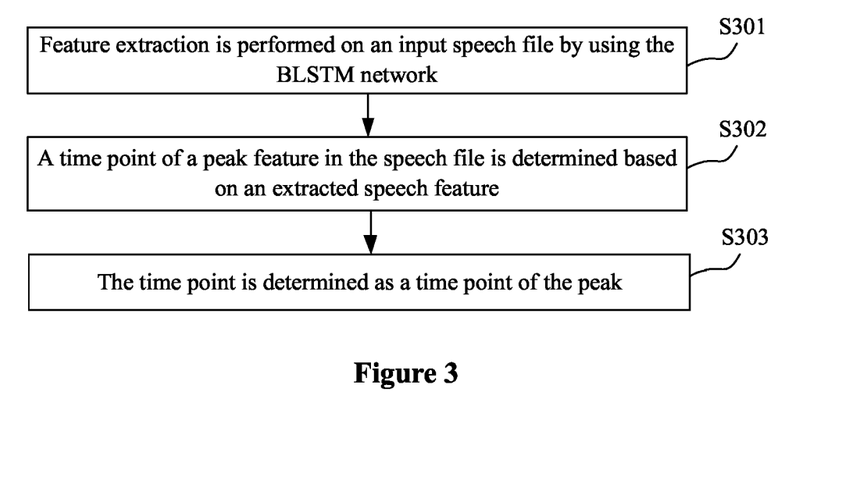
FIG. 3 is a flowchart of a method for training an acoustic network model according to another embodiment of the present disclosure.

Referring to FIG. 3, according to an embodiment of the present disclosure, the step of performing the peak detection on the speech in the speech file by using the BLSTM network includes the following steps S301 to S303.

In step S301, feature extraction is performed on an input speech file by using the BLSTM network.

Multiple feature extraction layers may be set in the BLSTM network. Feature values of the speech file are acquired based on the set feature extraction layers, and feature extraction is performed based on the feature values.

In step S302, a time point of a peak feature in the speech file is determined based on an extracted speech feature.

By performing a feature matching on the extracted features, a speech feature having a specific similarity with the peak feature may be determined. A time point of the peak feature in the speech file is determined by finding a time point of the determined speech feature.

In step S303, the time point is determined as a time point of the peak.

According to this embodiment, the time period of the peak may be quickly determined, so that the speech file is quickly segmented.

According to an embodiment of the present disclosure, the step of performing the semantic prediction on the speech segments based on the preset CTC segmentation network includes: performing semantic parsing on the speech segments by using the CTC segmentation network to obtain parsing results; and predicting semantic texts corresponding to the speech segments based on the parsing results.

Figure 4:
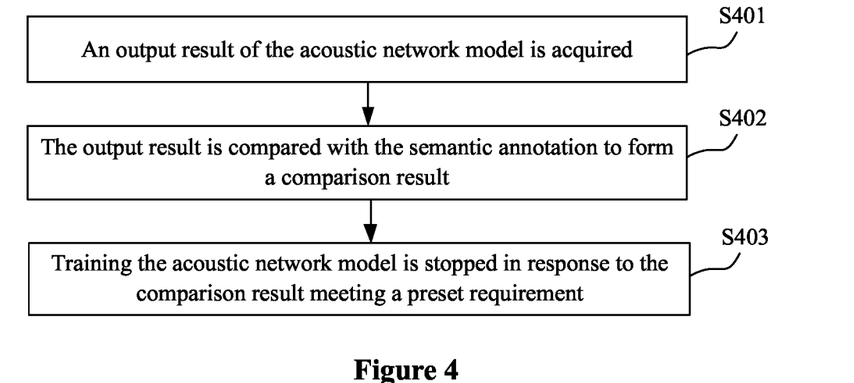
FIG. 4 is a flowchart of a method for training an acoustic network model according to another embodiment of the present disclosure.

Referring to FIG. 4, according to an embodiment of the present disclosure, the stopping training the acoustic network model in response to the prediction results meeting the preset performance requirement includes the following steps S401 to S403.

In step S401, an output result of the acoustic network model is acquired.

The acoustic model may parse the input speech file, to predict a text prediction result corresponding to the input speech file. Therefore, an output result of the acoustic network model may be acquired.

In step S402, the output result is compared with the semantic annotation to form a comparison result.

In step S403, training the acoustic network model is stopped in response to the comparison result meeting a preset requirement.

Preset performance indexes (for example, the accuracy of the prediction result) are set to determine accuracy of the prediction result of the acoustic network model. Training the acoustic network model is stopped in the case that the prediction result meets the preset requirement.

According to an embodiment of the present disclosure, before the performing the peak detection on the speech in the speech file by using the BLSTM network, the method further includes the following steps.

Firstly, a loss function for training the BLSTM network is formed based on a set first training parameter and a set second training parameter related to an LSTM network, after an LSTM network model is randomly initialized.

After the LSTM network is set, the loss function of the BLSTM may be constructed by using an output of the connectionist temporal classification (CTC) network connected to the output of the LSTM network. Then, the LSTM network model is trained by using the loss function.

In an embodiment, the loss function L of the BLSTM network may be constructed as follows:

$$L = a*CTC + b*KL.$$

In the formula, a is a first training parameter related to the CTC network, CTC is output content selected from the CTC network, b is a second training parameter related to a KL divergence, and KL is a divergence value of the LSTM network. The value of CTC may be set according to actual demands. For example, CTC may be set as a loss function value of the CTC network.

Secondly, a value of the first training parameter is gradually increased with a gradual decrease of a value of the second training parameter, in a training process of the BLSTM network.

In order to improve the speed of training, the first training parameter and the second training parameter may be revised. In an embodiment, a value of the first training parameter may be gradually increased and a value of the second training parameter may be gradually decreased.

Finally, training the BLSTM network is stopped in response to a performance index output by the BLSTM network meeting a preset requirement, to perform real-time peak detection on the input speech file by using the BLSTM network.

According to an embodiment of the present disclosure, the step of forming the loss function for training the BLSTM network includes: acquiring a first output result of the CTC network connected to the LSTM network model; and determining a product of the first output result and a first training parameter as a first component of the loss function.

According to an embodiment of the present disclosure, the step of forming the loss function for training the BLSTM network includes: acquiring a KL divergence output by the LSTM network model in a training process; and determining a product of the KL divergence and a second training parameter as a second component of the loss function.

Figure 5:
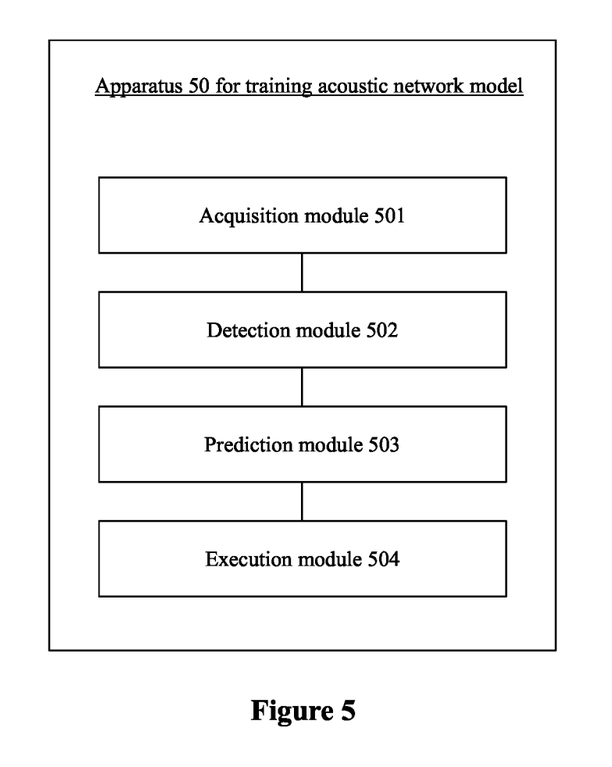
FIG. 5 is a schematic structural diagram of an apparatus for training an acoustic network model according to an embodiment of the present disclosure.

According to the foregoing method embodiments, referring to FIG. 5, an apparatus 50 for training an acoustic network model is further provided according to an embodiment of the present disclosure. The apparatus 50 includes an acquisition module 501, a detection module 502, a prediction module 503, and an execution module 504.

The acquisition module 501 is configured to acquire a training sample for training the acoustic network model, where the training sample includes at least one speech file.

The detection module 502 is configured to perform peak detection on speech in the speech file by using a BLSTM network, and divide letters in the speech file based on a detected peak to form speech segments.

The prediction module 503 is configured to perform semantic prediction on the speech segments based on a preset CTC segmentation network, to obtain text prediction results.

The execution module 504 is configured to stop training the acoustic network model in response to the prediction results meeting a preset performance requirement, to perform text prediction on input speech by using the acoustic network model.

For parts that are not described in detail in this embodiment, reference is made to the content recorded in the foregoing method embodiments, and details are not described herein again.

Figure 6:
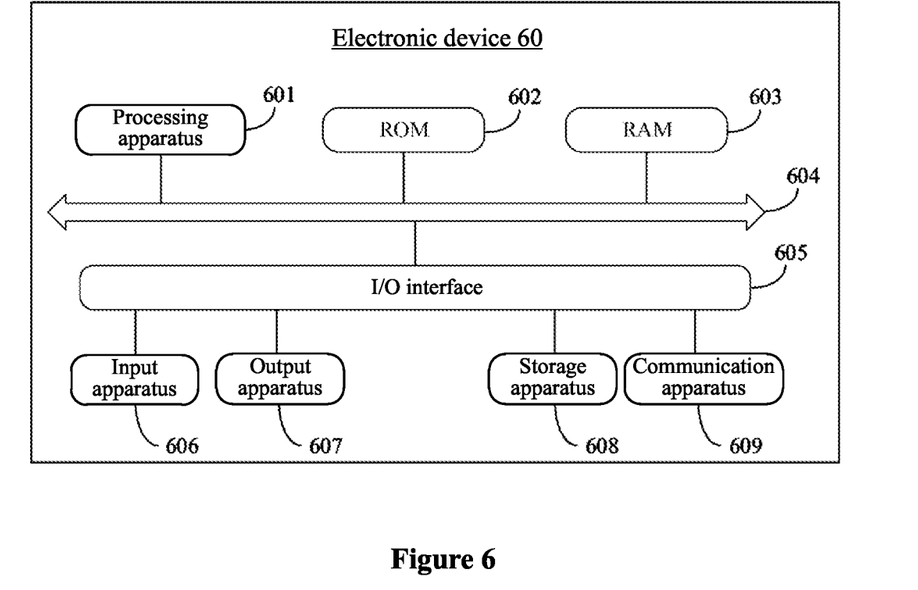
FIG. 6 is a schematic diagram of an electronic device according to an embodiment of the present disclosure.

Referring to FIG. 6, an electronic device 60 is further provided according to an embodiment of the present disclosure, which includes at least one processor, and a memory in communication with the at least one processor.

The memory stores instructions executable by the at least one processor. The instructions, when executed by the at least one processor, cause the at least one processor to perform the method for training the acoustic network model according to the foregoing method embodiments.

A non-transitory computer readable storage medium storing computer instructions is further provided according to an embodiment of the present disclosure. The computer instructions are used to cause a computer to perform the method for training the acoustic network model according to the foregoing method embodiments.

A computer program product is further provided according to an embodiment of the present disclosure. The computer program product includes a computer program stored on a non-transitory computer readable storage medium. The computer program includes program instructions that, when executed by a computer, cause the computer to perform the method for training the acoustic network model according to the foregoing method embodiments. A computer program is provided according to an embodiment of the present disclosure. The computer program, when executed by a computer, causes the computer to perform the method for training the acoustic network model according to the foregoing method embodiments.

Reference is made to FIG. 6, which is a schematic structural diagram of an electronic device 60 suitable for implementing the embodiments of the present disclosure. The electronic device according to the embodiments of the present disclosure may include, but is not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 6 is only exemplary, and should not indicate any limitation to the function and scope of application of the embodiments of the present disclosure.

As shown in FIG. 6, the electronic device 60 may include a processing apparatus 601, such as a central processing unit (CPU) or a graphics processor, which may execute various operations and processing based on a program stored in a read only memory (ROM) 602 or a program loaded from a storage apparatus 608 into a random access memory (RAM) 603. The RAM 603 is further configured to store various programs and data required by the electronic device 60 to perform an operation. The processing apparatus 601, the ROM 602 and the RAM 603 are connected to each other through a bus 604. An input/output (I/O) interface 605 is also connected to the bus 604.

Generally, the I/O interface 605 may be connected to: an input apparatus 606, such as a touch screen, a touch panel, a keyboard, a mouse, an image sensor, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 60 and other devices for data exchanging. Although FIG. 6 shows an electronic device 60 having various components, it should be understood that the illustrated components are not necessarily required to all be implemented or included. Alternatively, more or fewer components may be implemented or included.

Particularly, according to the embodiments of the present disclosure, the processes described above with reference to flowcharts may be implemented as a computer software program. For example, a computer program product is further provided as an embodiment in the present disclosure, including a computer program carried on a computer readable medium. The computer program includes program code for performing the method shown in the flowchart. In the embodiment, the computer program may be downloaded and installed from the network via the communication apparatus 609, or installed from the storage apparatus 608, or installed from the ROM 602. When the computer program is executed by the processing apparatus 601, the functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

The computer readable medium may be incorporated in the electronic device, or may exist alone without being assembled into the electronic device.

The computer readable medium carries one or more programs. The one or more programs, when executed by the electronic device, cause the electronic device to: acquire at least two Internet Protocol addresses; send a node evaluation request including the at least two Internet Protocol addresses to a node evaluation device, where the node evaluation device selects an Internet Protocol address from the at least two Internet Protocol addresses and returns the selected Internet Protocol address; and receiving the Internet Protocol address returned by the node evaluation device, where the acquired Internet Protocol address indicates an edge node in a content distribution network.

Alternatively, the computer readable medium carries one or more programs. The one or more programs, when executed by the electronic device, cause the electronic device to: receive a node evaluation request including at least two Internet Protocol addresses; select an Internet Protocol address from the at least two Internet Protocol addresses; and return the selected Internet Protocol address, where the received Internet Protocol address indicates an edge node in a content distribution network.

The computer program code for performing the operations disclosed in the embodiments of the present disclosure may be written in one or more programming languages or combinations thereof. The programming languages include an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program produce according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

A method for training an acoustic network model is provided according to one or more embodiments of the present disclosure. The method includes:
   acquiring a training sample for training the acoustic network model, where the training sample includes at least one speech file;
   performing peak detection on speech in the speech file by using a BLSTM network, and dividing letters in the speech file based on a detected peak to forming speech segments;
   performing semantic prediction on the speech segments based on a preset CTC segmentation network, to obtain text prediction results; and
   stopping training the acoustic network model in response to the prediction results meeting a preset performance demand, to perform text prediction on input speech by using the acoustic network model.

According to one or more embodiments of the present disclosure, the acquiring the training sample for training the acoustic network model, where the training sample includes the at least one speech file, includes:
   acquiring multiple speech files based on a preset category;
   performing semantic annotation on the multiple speech files; and
   forming the training sample based on annotated semantic files.

According to one or more embodiments of the present disclosure, the performing the peak detection on the speech in the speech file by using the BLSTM network includes:
   performing feature extraction on an input speech file by using the BLSTM network;
   determining a time point of a peak feature in the speech file based on an extracted speech feature; and
   determining the time point as a time point of the peak.

According to one or more embodiments of the present disclosure, the performing the semantic prediction on the speech segments based on the preset CTC segmentation network includes:
   performing semantic parsing on the speech segments by using the CTC segmentation network, to obtain parsing results; and
   predicting semantic texts corresponding to the speech segments based on the parsing results.

According to one or more embodiments of the present disclosure, the stopping training the acoustic network model in response to the prediction results meeting the preset performance requirement includes:
   acquiring an output result of the acoustic network model;
   comparing the output result with the semantic annotation to form a comparison result; and
   stopping training the acoustic network model in response to the comparison result meeting a preset requirement.

According to one or more embodiments of the present disclosure, before the performing the peak detection on the speech in the speech file by using the BLSTM network, the method further includes:
   forming a loss function for training the BLSTM network based on a set first training parameter and a set second training parameter related to an LSTM network by using a training result of the LSTM network, after randomly initializing an LSTM network model;
   gradually increasing a value of the first training parameter with a gradual decrease of a value of the second training parameter, in a training process of the BLSTM network; and
   stopping training the BLSTM network, in response to a performance index output by the BLSTM network meeting a preset demand, to perform real-time peak detection on the input speech file by using the BLSTM network.

According to one or more embodiments of the present disclosure, the forming the loss function for training the BLSTM network includes:
   acquiring a first output result of the CTC network connected to the LSTM network model; and
   determining a product of the first output result and a first training parameter as a first component of the loss function.

According to one or more embodiments of the present disclosure, the forming the loss function for training the BLSTM network includes:
   acquiring a KL divergence output by the LSTM network model in a training process of the LSTM network model; and
   determining a product of the KL divergence and a second training parameter as a second component of the loss function.

An apparatus for training an acoustic network model is provided according to one or more embodiments of the present disclosure. The apparatus includes an acquisition module, a detection module, a prediction module, and an execution module.

The acquisition module is configured to acquire a training sample for training the acoustic network model, where the training sample includes at least one speech file.

The detection module is configured to perform peak detection on speech in the speech file by using a BLSTM network, and divide letters in the speech file based on a detected peak to form speech segments.

The prediction module is configured to perform semantic prediction on the speech segments based on a preset CTC segmentation network, to obtain text prediction results.

The execution module is configured to stop training the acoustic network model in response to the prediction results meeting a preset performance demand, to perform text prediction on input speech by using the acoustic network model.

According to one or more embodiments of the present disclosure, the apparatus for training the acoustic network model is further configured to:
  acquire multiple speech files based on preset categories;
  perform semantic annotation on the multiple speech files; and
  form the training sample based on annotated semantic files.

According to one or more embodiments of the present disclosure, the apparatus for training the acoustic network model is further configured to:
  perform feature extraction on an input speech file by using the BLSTM network;
  determine a time point of a peak feature in the speech file based on an extracted speech feature; and
  determine the time point as a time point of the peak.

According to one or more embodiments of the present disclosure, the apparatus for training the acoustic network model is further configured to:
  perform semantic parsing on the speech segments by using the CTC segmentation network, to obtain parsing results; and
  predict semantic texts corresponding to the speech segments based on the parsing results.

According to one or more embodiments of the present disclosure, the apparatus for training the acoustic network model is further configured to:
  acquire an output result of the acoustic network model;
  compare the output result with the semantic annotation to form a comparison result; and
  stop training the acoustic network model in response to the comparison result meeting a preset requirement.

According to one or more embodiments of the present disclosure, the apparatus for training the acoustic network model is further configured to:
  form a loss function for training the BLSTM network based on a set first training parameter and a set second training parameter related to an LSTM network by using a training result of the LSTM network, after randomly initializing an LSTM network model;
  gradually increase a value of the first training parameter with a gradual decrease of a value of the second training parameter, in a process of training the BLSTM network; and
  stop training the BLSTM network in response to a performance index output by the BLSTM network meeting a preset requirement, to perform real-time peak detection on an input speech file by using the BLSTM network.

According to one or more embodiments of the present disclosure, the apparatus for training the acoustic network model is further configured to:
  acquire a first output result of a CTC network connected to the LSTM network model; and
  determine a product of the first output result and the first training parameter as a first component of the loss function.

According to one or more embodiments of the present disclosure, the apparatus for training the acoustic network model is further configured to:
  acquire a KL divergence output by the LSTM network model in a training process of the LSTM network model; and
  determine a product of the KL divergence and the second training parameter as a second component of the loss function.

The units mentioned in the description of the embodiments of the present disclosure may be implemented by means of software, or otherwise by means of hardware. The name of the unit does not constitute a limitation on the unit itself in some circumstances. For example, a first acquisition unit may be described as "a unit for acquiring at least two Internet Protocol addresses".

It should be understood that, each part of the present disclosure may be implemented by hardware, software, firmware, or a combination of them.

The above are only specific embodiments of the present disclosure, but the scope of protection of the present disclosure is not limited thereto. Changes and substitutions which may be easily contemplated by those skilled in the art within the technical scope disclosed in the present disclosure shall fall within the scope of protection of the present disclosure. Therefore, the scope of protection of the present disclosure shall be defined by the appended claims.

The invention claimed is:

1. A method for training an acoustic network model, comprising:
  acquiring a training sample for training the acoustic network model, wherein the training sample comprises at least one speech file;
  performing peak detection on speech in the speech file by using a bidirectional long short-term memory (BLSTM) network, and dividing letters in the speech file based on a detected peak to form speech segments;
  performing semantic prediction on the speech segments based on a preset connectionist temporal classification (CTC) segmentation network, to obtain text prediction results; and
  stopping training the acoustic network model in response to the prediction results meeting a preset performance demand, to perform text prediction on input speech by using the acoustic network model.

2. The method according to claim 1, wherein the acquiring the training sample for training the acoustic network model, wherein the training sample comprises the at least one speech file, comprises:
  acquiring a plurality of speech files based on preset categories;
  performing semantic annotation on the plurality of speech files; and
  forming the training sample based on annotated semantic files.

3. The method according to claim 1, wherein the performing the peak detection on the speech in the speech file by using the BLSTM network comprises:
  performing feature extraction on an input speech file by using the BLSTM network;
  determining a time point of a peak feature in the speech file based on an extracted speech feature; and
  determining the time point as a time point of the peak.

4. The method according to claim 1, wherein the performing the semantic prediction on the speech segments based on the preset CTC segmentation network comprises:
- performing semantic parsing on the speech segments by using the CTC segmentation network, to obtain parsing results; and
- predicting semantic texts corresponding to the speech segments based on the parsing results.

5. The method according to claim 1, wherein the stopping training the acoustic network model in response to the prediction results meeting the preset performance requirement comprises:
- acquiring an output result of the acoustic network model;
- comparing the output result with the semantic annotation to form a comparison result; and
- stopping training the acoustic network model in response to the comparison result meeting a preset demand.

6. The method according to claim 1, wherein before the performing the peak detection on the speech in the speech file by using the BLSTM network, the method further comprises:
- forming a loss function for training the BLSTM network based on a set first training parameter and a set second training parameter related to a long short-term memory (LSTM) network by using a training result of the LSTM network, after randomly initializing an LSTM network model;
- gradually increasing a value of the first training parameter with a gradual decrease of a value of the second training parameter, in a process of training the BLSTM network; and
- stopping training the BLSTM network in response to a performance index output by the BLSTM network meeting a preset demand, to perform real-time peak detection on an input speech file by using the BLSTM network.

7. The method according to claim 6, wherein the forming the loss function for training the BLSTM network comprises:
- acquiring a first output result of the CTC segmentation network connected to the LSTM network model; and
- determining a product of the first output result and the first training parameter as a first component of the loss function.

8. The method according to claim 6, wherein the forming the loss function for training the BLSTM network comprises:
- acquiring a KL divergence output by the LSTM network model in a training process of the LSTM network model; and
- determining a product of the KL divergence and the second training parameter as a second component of the loss function.

9. An apparatus for training an acoustic network model, comprising:
- at least one processor; and
- a memory in communication with the at least one processor, wherein
- the memory stores instructions executable by the at least one processor, and the instructions, when executed by the at least one processor, cause the at least one processor to:
- acquire a training sample for training the acoustic network model, wherein the training sample comprises at least one speech file;
- perform peak detection on speech in the speech file by using a bidirectional long short-term memory (BLSTM) network, and divide letters in the speech file based on a detected peak to form speech segments;
- perform semantic prediction on the speech segments based on a preset connectionist temporal classification (CTC) segmentation network to obtain text prediction results; and
- stop training the acoustic network model in response to the prediction results meeting a preset performance demand, to perform text prediction on input speech by using the acoustic network model.

10. The apparatus according to claim 9, wherein the instructions, when executed by the at least one processor, cause the at least one processor to:
- acquire a plurality of speech files based on preset categories;
- perform semantic annotation on the plurality of speech files; and
- form the training sample based on annotated semantic files.

11. The apparatus according to claim 9, wherein the instructions, when executed by the at least one processor, cause the at least one processor to:
- perform feature extraction on an input speech file by using the BLSTM network;
- determine a time point of a peak feature in the speech file based on an extracted speech feature; and
- determine the time point as a time point of the peak.

12. The apparatus according to claim 9, wherein the instructions, when executed by the at least one processor, cause the at least one processor to:
- perform semantic parsing on the speech segments by using the CTC segmentation network, to obtain parsing results; and
- predict semantic texts corresponding to the speech segments based on the parsing results.

13. The apparatus according to claim 9, wherein the instructions, when executed by the at least one processor, cause the at least one processor to:
- acquire an output result of the acoustic network model;
- compare the output result with the semantic annotation to form a comparison result; and
- stop training the acoustic network model in response to the comparison result meeting a preset demand.

14. The apparatus according to claim 9, wherein the instructions, when executed by the at least one processor, cause the at least one processor to:
- form a loss function for training the BLSTM network based on a set first training parameter and a set second training parameter related to an long short-term memory (LSTM) network by using a training result of the LSTM network, after randomly initializing an LSTM network model;
- gradually increase a value of the first training parameter with a gradual decrease of a value of the second training parameter, in a process of training the BLSTM network; and
- stop training the BLSTM network in response to a performance index output by the BLSTM network meeting a preset demand, to perform real-time peak detection on an input speech file by using the BLSTM network.

15. The apparatus according to claim 14, wherein the instructions, when executed by the at least one processor, cause the at least one processor to:
- acquire a first output result of the CTC segmentation network connected to the LSTM network model; and determine a product of the first output result and the first training parameter as a first component of the loss function.

16. The apparatus according to claim 14, wherein the instructions, when executed by the at least one processor, cause the at least one processor to:
    acquire a KL divergence output by the LSTM network model in a training process of the LSTM network model; and
determine a product of the KL divergence and the second training parameter as a second component of the loss function.

17. A non-transitory computer readable storage medium storing computer instructions, wherein the computer instructions, when executed by a computer, cause the computer to
    acquire a training sample for training the acoustic network model, wherein the training sample comprises at least one speech file;
    perform peak detection on speech in the speech file by using a bidirectional long short-term memory BLSTM network, and divide letters in the speech file based on a detected peak to form speech segments;
    perform semantic prediction on the speech segments based on a preset connectionist temporal classification CTC segmentation network to obtain text prediction results; and
    stop training the acoustic network model in response to the prediction results meeting a preset performance demand, to perform text prediction on input speech by using the acoustic network model.

18. The non-transitory computer readable storage medium according to claim 11, wherein the computer instructions, when executed by a computer, cause the computer to:
    acquire a plurality of speech files based on preset categories;
    perform semantic annotation on the plurality of speech files; and
    form the training sample based on annotated semantic files.

19. The non-transitory computer readable storage medium according to claim 17, wherein the computer instructions, when executed by a computer, cause the computer to:
    perform feature extraction on an input speech file by using the BLSTM network;
    determine a time point of a peak feature in the speech file based on an extracted speech feature; and
    determine the time point as a time point of the peak.

20. The non-transitory computer readable storage medium according to claim 17, wherein the computer instructions, when executed by a computer, cause the computer to:
    perform semantic parsing on the speech segments by using the CTC segmentation network, to obtain parsing results; and
    predict semantic texts corresponding to the speech segments based on the parsing results.

\* \* \* \* \*